US008820427B2

(12) United States Patent
Blunier et al.

(10) Patent No.: US 8,820,427 B2
(45) Date of Patent: Sep. 2, 2014

(54) STORAGE TANK FRAME ASSEMBLY FOR AN AGRICULTURAL IMPLEMENT

(75) Inventors: Timothy R. Blunier, Danvers, IL (US);
Jessica Haynes, West Bend, IL (US);
Brian McMahon, Deer Creek, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/604,692

(22) Filed: Sep. 6, 2012

(65) Prior Publication Data
US 2014/0060863 A1  Mar. 6, 2014

(51) Int. Cl.
*A01B 5/00* (2006.01)
*A01B 49/02* (2006.01)

(52) U.S. Cl.
USPC ........................................... 172/133

(58) Field of Classification Search
USPC .......... 172/133, 443, 677, 776, 166; 111/925, 111/8, 123; 280/124.114
See application file for complete search history.

(56) References Cited

U.S. PATENT DOCUMENTS

| 763,116 | A | | 6/1904 | Rogers | |
|---|---|---|---|---|---|
| 3,295,482 | A | * | 1/1967 | Dountas et al. | 111/120 |
| 3,396,685 | A | * | 8/1968 | Meiners | 111/123 |
| 3,608,645 | A | * | 9/1971 | Meiners | 172/491 |
| 3,718,343 | A | * | 2/1973 | Mills | 280/124.114 |
| 3,752,092 | A | * | 8/1973 | Vinyard | 111/123 |
| 4,015,549 | A | * | 4/1977 | Brown, Jr. | 111/8 |
| 4,394,027 | A | | 7/1983 | Watkins, Jr. | |
| 4,433,735 | A | * | 2/1984 | Clark | 172/443 |
| 4,434,991 | A | * | 3/1984 | Winterton | 280/830 |
| 4,624,471 | A | * | 11/1986 | Haines et al. | 172/443 |
| 4,650,124 | A | * | 3/1987 | Connaughty et al. | 239/708 |
| 5,178,328 | A | * | 1/1993 | Broyhill | 239/168 |
| 5,538,286 | A | | 7/1996 | Hoff | |
| 5,779,255 | A | * | 7/1998 | Garcia, Jr. | 280/404 |
| 6,584,919 | B2 | | 7/2003 | McQuinn | |
| 6,675,907 | B2 | * | 1/2004 | Moser et al. | 172/311 |
| 7,758,076 | B1 | | 7/2010 | DiGiacomo | |
| 8,079,425 | B1 | | 12/2011 | Van Kooten et al. | |
| 2012/0001403 | A1 | | 1/2012 | Wydner | |

FOREIGN PATENT DOCUMENTS

EP    0277733 A1    8/1968
EP    1574367 A2    9/2005

OTHER PUBLICATIONS

Joskin Slurry Spreaders, Joskin, Jul. 31, 2006; http://www.rekord-systern.no/Html%20sider/Brosjyrer/Pdf%20filer/Slurry_spreaders_-_40_pages1_(J98761178).pdf.

* cited by examiner

*Primary Examiner* — Árpád Fábián-Kovács
(74) *Attorney, Agent, or Firm* — Rebecca L. Henkel

(57) ABSTRACT

A storage tank frame assembly for an agricultural implement. One agricultural implement includes a tool bar assembly having a tool bar and row units coupled to the tool bar and configured to deliver flowable agricultural product to a field. The agricultural implement also includes a storage tank configured to hold the flowable agricultural product and to provide the flowable agricultural product to the row units. The agricultural implement includes a frame assembly having a first and a second mounting assembly. The frame assembly is coupled to the tool bar assembly. The agricultural implement also includes an axle removably coupled to the frame assembly and configured to be coupled to wheels for transportation of the agricultural implement. The frame assembly is configured to be coupled to multiple sizes of storage tanks via the first mounting assembly and to multiple sizes of axles via the second mounting assembly.

17 Claims, 5 Drawing Sheets

STORAGE TANK FRAME ASSEMBLY FOR AN AGRICULTURAL IMPLEMENT

BACKGROUND

The invention relates generally to ground working equipment, such as agricultural equipment, and more specifically, to a storage tank frame assembly for an agricultural implement.

Generally, fertilizer application implements are towed behind a tractor or other work vehicle via a hitch assembly secured to a rigid frame of the implement. These fertilizer application implements typically include one or more ground engaging tools or openers that form a path for fertilizer deposition into the soil. The openers are used to break the soil, thereby enabling injection nozzles (e.g., positioned behind the openers) to deposit fertilizer at a desired depth beneath the soil surface. In certain embodiments, the implement may include knives (e.g., positioned behind the openers), instead of the injection nozzles, to flow the liquid fertilizer into respective trenches formed by the openers and the knives. Using such implements, fertilizer may be distributed throughout a field, either before or after planting, to facilitate enhanced crop development.

A fertilizer application implement may include a storage tank to house a flowable agricultural product for distribution throughout a field. The storage tank is typically supported by a frame assembly. Further, the frame assembly is supported by a pair of wheels, which are coupled together via an axle, and facilitate movement through the field. Various sizes of storage tanks may be used to house the flowable agricultural product. However, the storage tank size may be limited by a storage tank mounting interface of the frame assembly, and/or by the capacity of the wheels and axle coupled to the frame assembly. In addition, spacing between the wheels may be fixed by the length of the axle coupled to the frame assembly.

BRIEF DESCRIPTION

In one embodiment, an agricultural implement includes a tool bar assembly having a tool bar and row units coupled to the tool bar and configured to deliver flowable agricultural product to a field. The agricultural implement also includes a first storage tank configured to hold the flowable agricultural product and to provide the flowable agricultural product to the row units. The agricultural implement includes a frame assembly coupled to the tool bar assembly. The frame assembly includes a first mounting assembly and a second mounting assembly. The first mounting assembly is configured to removably couple the first storage tank to the frame assembly, and the frame assembly is configured to provide structural support to the first storage tank. The agricultural implement also includes a first axle removably coupled to the second mounting assembly and configured to be coupled to wheels to enable transportation of the agricultural implement. The first mounting assembly is configured to removably couple a second storage tank having a different storage capacity than the first storage tank to the frame assembly. The second mounting assembly is configured to removably couple a second axle having different dimensions than the first axle to the frame assembly.

In another embodiment, an agricultural implement includes a first storage tank configured to hold flowable agricultural product. The agricultural implement also includes a frame assembly having a first mounting assembly and a second mounting assembly. The first mounting assembly is configured to removably couple the first storage tank to the frame assembly. The frame assembly is configured to provide structural support to the first storage tank. The agricultural implement includes a first axle removably coupled to the second mounting assembly and configured to be coupled to wheels to enable transportation of the agricultural implement. The first mounting assembly is configured to removably couple a second storage tank having a different storage capacity than the first storage tank to the frame assembly. The second mounting assembly is configured to removably couple a second axle having different dimensions than the first axle to the frame assembly.

In a further embodiment, an agricultural implement includes a frame assembly having a first mounting assembly and a second mounting assembly. The first mounting assembly is configured to removably couple a first storage tank to the frame assembly. The frame assembly is configured to provide structural support to the first storage tank. The second mounting assembly is configured to removably couple a first axle. The first mounting assembly is configured to removably couple a second storage tank having a different storage capacity than the first storage tank to the frame assembly. The second mounting assembly is configured to removably couple a second axle having different dimensions than the first axle to the frame assembly.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
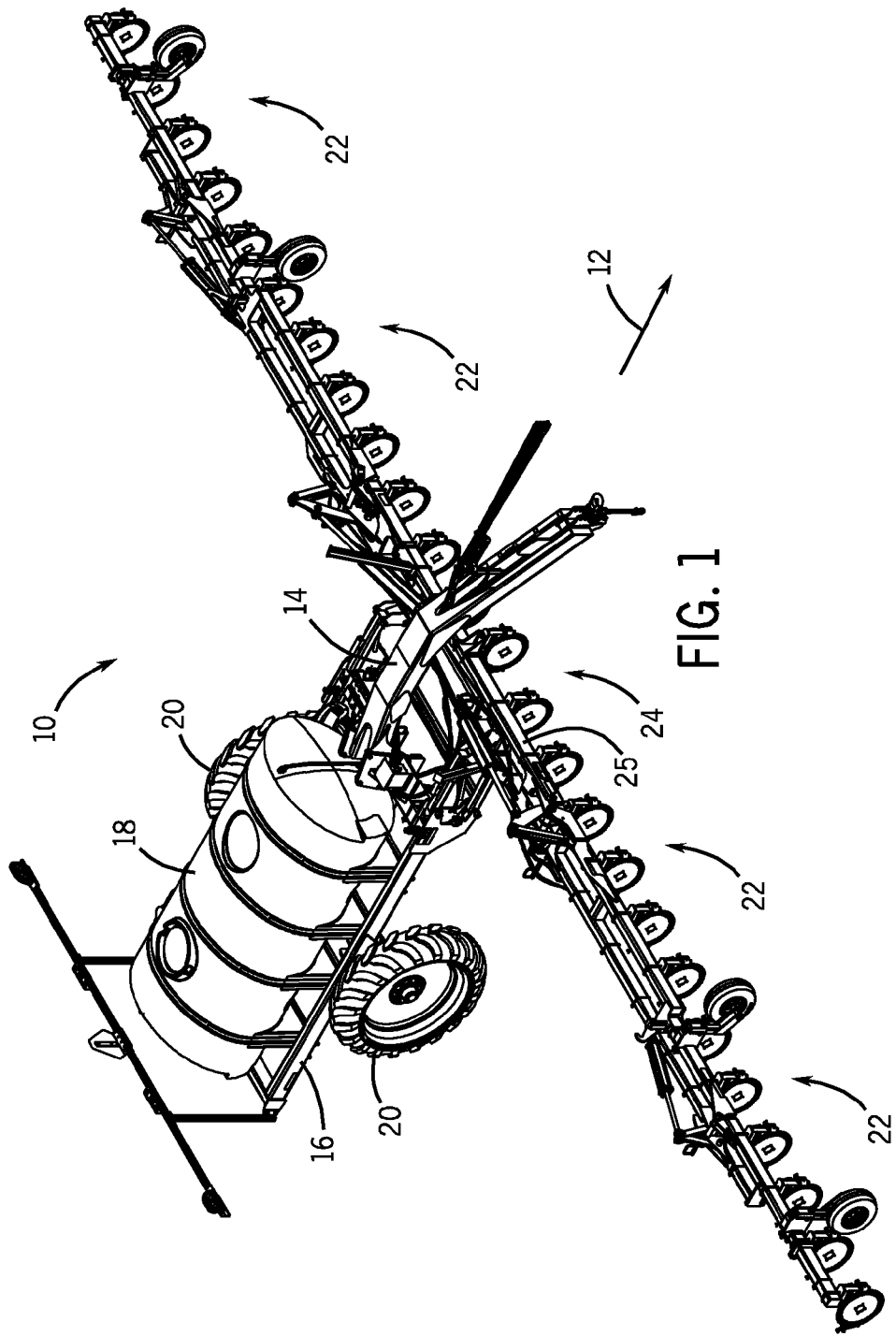
FIG. 1 is a perspective view of an embodiment of an agricultural implement having a storage tank mounted to a frame assembly.

FIG. 1 is a perspective view of an embodiment of an agricultural implement 10 having a storage tank mounted to a frame assembly. In the illustrated embodiment, the implement 10 is configured to be towed along a direction of travel 12 by a work vehicle, such as a tractor or other prime mover. The work vehicle may be coupled to the implement 10 by a hitch assembly 14, such as the illustrated "goose neck" pull frame. As illustrated, the hitch assembly 14 is coupled to a frame assembly 16 of the implement 10 to facilitate towing of the implement 10 in the direction of travel 12. In the illustrated embodiment, the frame assembly 16 supports a storage tank 18 configured to house a flowable agricultural product, such as liquid fertilizer. A pair of wheels 20 coupled to the frame assembly 16 is configured to support the weight of the frame assembly 16, the storage tank 18, and the flowable agricultural product, thereby enabling the implement 10 to be towed across the field.

The implement 10 is configured to transfer the flowable agricultural product from the storage tank 18 to multiple row units 22 of a tool bar assembly 24 having a tool bar 25. Each row unit 22 includes a ground engaging tool configured to break the soil, thereby excavating a trench into the soil. An injection nozzle or knife (e.g., positioned behind the ground engaging tool) is configured to deposit flowable agricultural product from the storage tank 18 into the trench formed by the ground engaging tool. In certain embodiments, the penetration depth of the ground engaging tools is adjustable to facilitate deposition of the agricultural product at a desired depth beneath the soil surface. Accordingly, a flowable agricultural product, such as liquid fertilizer, may be distributed throughout a field, either before or after planting, to facilitate enhanced crop development.

While the illustrated implement 10 includes 25 row units 22, it should be appreciated that alternative implements may include more or fewer row units 22. In addition, the number of row units and the spacing between row units may be particularly selected to correspond to the arrangement of row units on respective seeding or planting implements. For example, the implement 10 may include 25 row units 22 spaced 30 inches from one another. Accordingly, as the implement 10 is towed across a field, the row units 22 deposit fertilizer in rows having 30-inch spacing. After the fertilizer is applied, a seeding or planting implement (e.g., having row units spaced 30 inches from one another) may deposit seeds between the rows of fertilizer (e.g., the approximate midpoint between rows), thereby facilitating enhanced crop development. In addition, the implement 10 may be utilized to apply fertilizer to previously planted seeds (e.g., via injecting fertilizer between rows of the previously planted seeds).

The frame assembly 16 may include a first mounting assembly and a second mounting assembly. The first mounting assembly may be configured to be coupled to multiple sizes of storage tanks (e.g., tanks having different storage capacities). Further, the second mounting assembly may be configured to be coupled to multiple sizes of axles (e.g., axles having different dimensions). As may be appreciated, multiple sizes of axles may be used based on the row spacing (e.g., to keep wheels and/or tires centered between planted rows of crop). Accordingly, less harm to crop may be facilitated by keeping the wheels and/or tires centered between planted rows of crop. Accordingly, the frame assembly 16 may enable the agricultural implement 10 to be modularized. For example, the frame assembly 16 may facilitate removal and replacement of storage tanks having different sizes. Moreover, the frame assembly 16 may facilitate removal and replacement of axles having different sizes (e.g., to accommodate different size storage tanks 18, to accommodate different row spacings, etc.). Such removal and replacement of storage tanks and axles may be performed quickly and easily due to the modularization. Therefore, the agricultural implement 10 may accommodate different storage tanks and/or axles. Thus, the modularized implement may obviate the acquisition of multiple implements to accommodate varying field configurations, thereby reducing fertilization costs.

Figure 2:
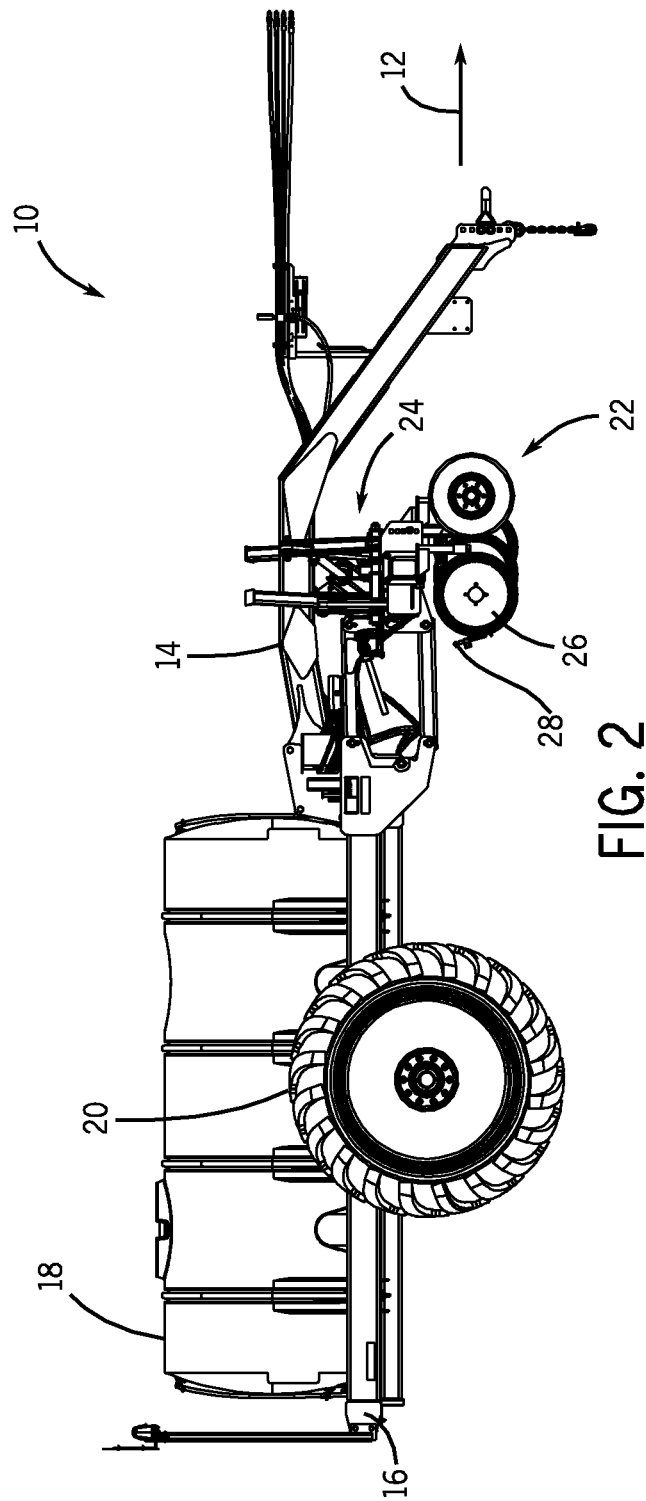
FIG. 2 is a side view of the agricultural implement of FIG. 1.

FIG. 2 is a side view of an embodiment of the agricultural implement 10 having the storage tank 18 mounted to the frame assembly 16. As discussed previously, the agricultural implement 10 includes multiple row units 22. Each of the row units 22 includes a ground engaging tool 26 configured to break the soil, thereby excavating a trench into the soil. Further, each of the row units 22 includes an injection nozzle 28, which is positioned behind the ground engaging tool, and configured to deposit the flowable agricultural product from the storage tank 18 into the trench formed by the ground engaging tool 26. Accordingly, a flowable agricultural product may be distributed throughout a field to facilitate enhanced crop development.

Figure 3:
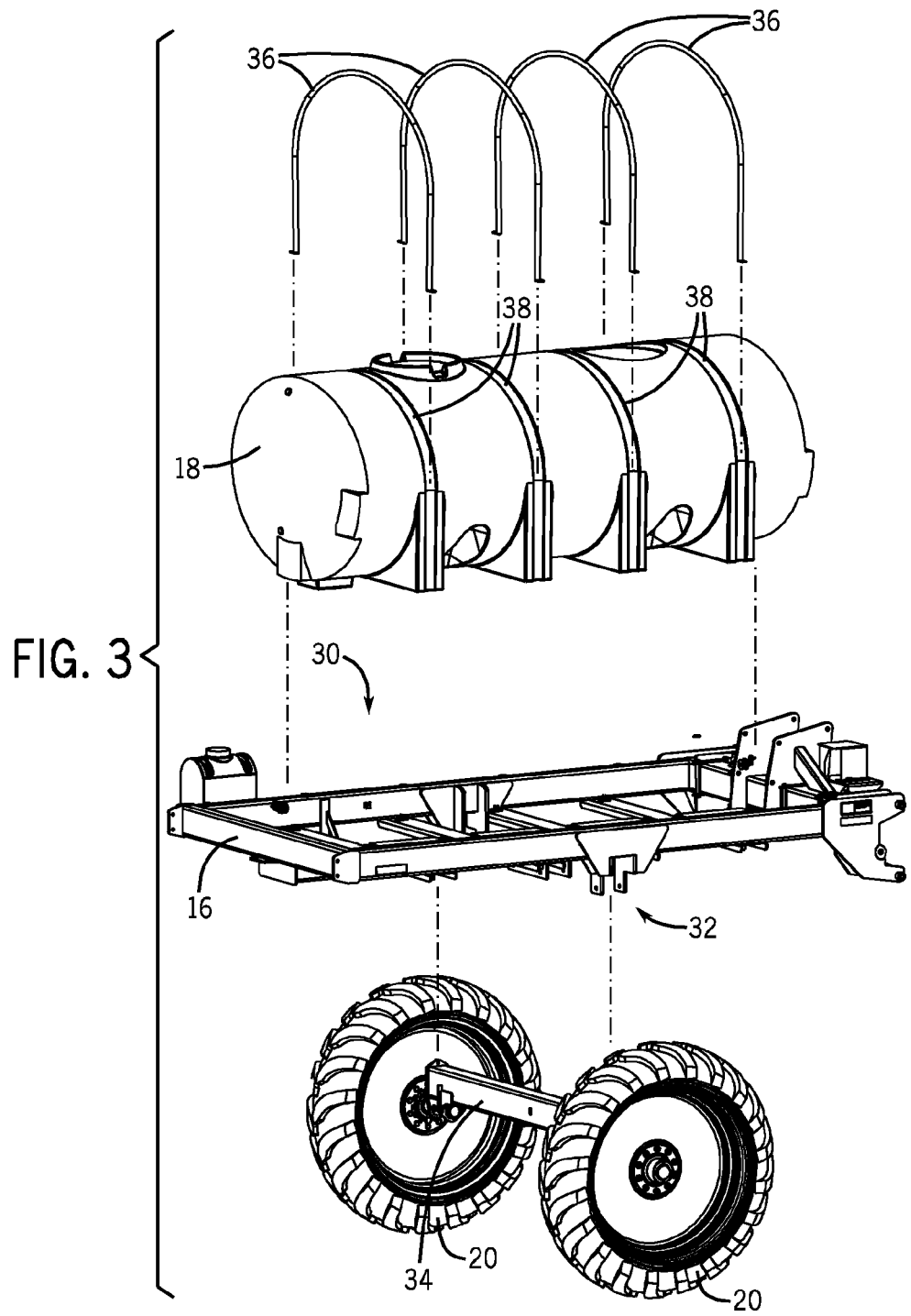
FIG. 3 is an exploded view of an embodiment of an agricultural implement having a storage tank, a frame assembly, and wheels.

FIG. 3 is an exploded view of an embodiment of the agricultural implement 10 having the storage tank 18, the frame assembly 16, and the wheels 20. To facilitate mounting of the storage tank 18, the frame assembly 16 includes a first mounting assembly 30. Furthermore, the frame assembly 16 includes a second mounting assembly 32 to facilitate mounting of an axle 34 coupled to the wheels 20. The storage tank 18 is mounted to the frame assembly 16 using arched members 36 (e.g., securing members) disposed in slots 38 of the storage tank 18. The arched members 36 are secured to the first mounting assembly 30. Moreover, the axle 34 is mounted to the frame assembly 16 by inserting the axle 34 into brackets of the second mounting assembly 32, and securing the axle 34 within the brackets, as explained in detail below. Accordingly, the first mounting assembly 30 of the frame assembly 16 facilitates quick and easy installation, removal, and/or replacement of the storage tank 18. In addition, the second mounting assembly 32 of the frame assembly 16 facilitates quick and easy installation, removal, and/or replacement of the axle 34.

Figure 4:
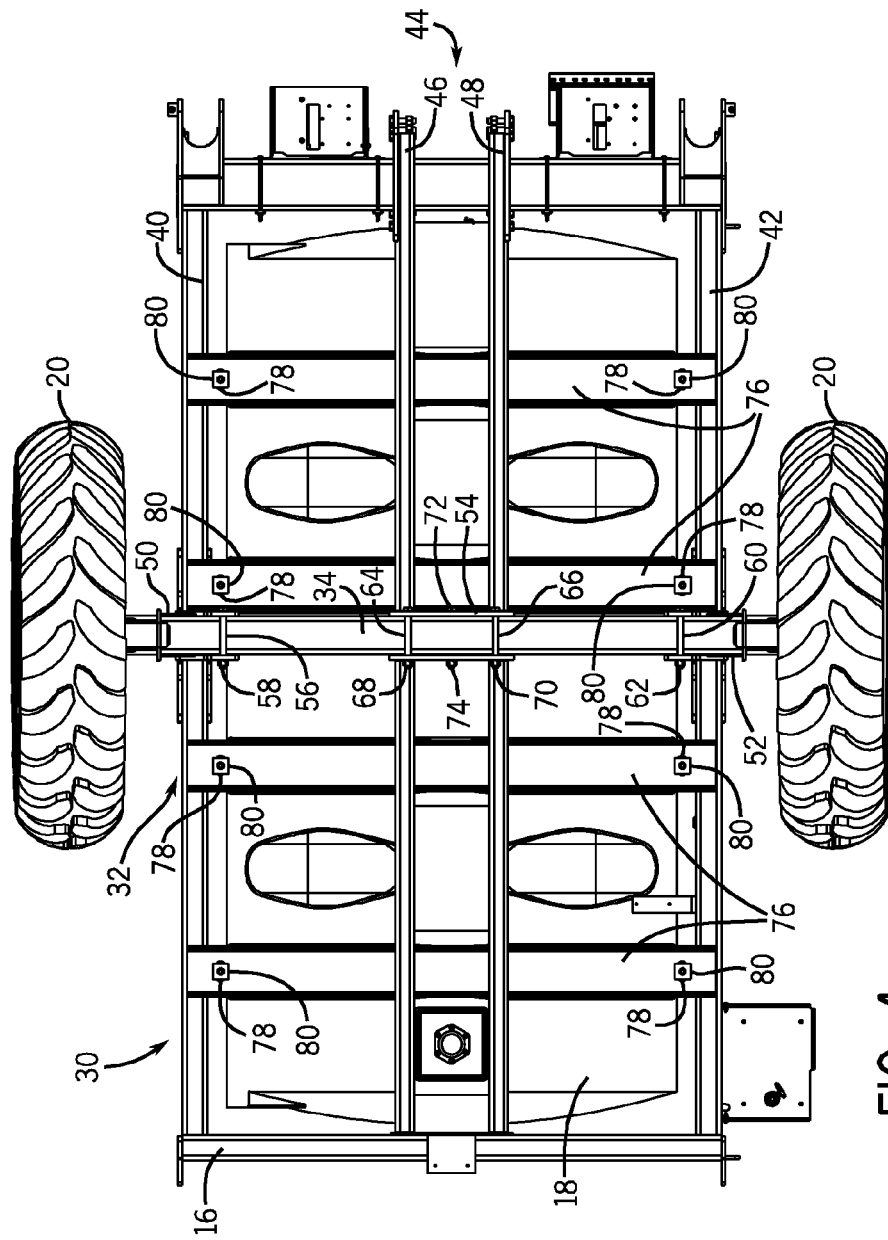
FIG. 4 is a bottom view of an embodiment of an agricultural implement having a storage tank mounted to a frame assembly.

FIG. 4 is a bottom view of an embodiment of the agricultural implement 10 having the storage tank 18 mounted to the frame assembly 16, illustrating structural elements of the first mounting assembly 30 and the second mounting assembly 32. As such, the second mounting assembly 32 includes a first longitudinal beam 40 extending along a first lateral side of the frame assembly 16, and a second longitudinal beam 42 extending along a second lateral side of the frame assembly 16. Moreover, the second mounting assembly 32 also includes a center beam assembly 44 extending along a central portion of the frame assembly 16. As illustrated, the center beam assembly 44 includes a first beam 46 and a second beam 48. The first longitudinal beam 40, the second longitudinal beam 42, and the center beam assembly 44 extend parallel to each other.

The second mounting assembly 32 includes a first bracket assembly 50 coupled to the first longitudinal beam 40, a second bracket assembly 52 coupled to the second longitudinal beam 42, and a third bracket assembly 54 coupled to the center beam assembly 44. The first, second, and third bracket assemblies 50, 52, and 54 are configured to secure the axle 34 to the frame assembly 16. Specifically, a fastener 56 (e.g., bolt, screw, pin, etc.) and a locking device 58 (e.g., nut, pin, etc.) are used to secure the axle 34 within the first bracket assembly 50. Further, a fastener 60 and a locking device 62 are used to secure the axle 34 within the second bracket assembly 52. Moreover, fasteners 64 and 66, and respective locking devices 68 and 70 are used to secure the axle 34 within the third bracket assembly 54. In addition, a fastener 72 and a locking device 74 may be used to secure the axle 34 to the third bracket assembly 54. For example, the fastener 72 may be inserted through openings in the third bracket assembly 54 and openings in the axle 34 to secure the axle 34 to the third bracket assembly 54. As may be appreciated, by inserting the fastener 72 through the axle 34 and the third bracket assembly 54 lateral movement of the axle 34 within the third bracket assembly 54 may be blocked.

The first mounting assembly 30 includes crossmembers 76 coupled to the first longitudinal beam 40, the second longitudinal beam 42, and the center beam assembly 44. As illustrated, the crossmembers 76 are arranged perpendicular to the first longitudinal beam 40, the second longitudinal beam 42, and the center beam assembly 44. Further, the crossmembers 76 are arranged parallel to each other. As illustrated, the first longitudinal beam 40, the second longitudinal beam 42, the center beam assembly 44, and the crossmembers 76 form a ladder frame. During assembly, the storage tank 18 is attached to the first mounting assembly 30 by inserting the arched members 36 through openings 78 in the crossmembers 76, and securing the arched members 36 to the crossmembers 76 using securing mechanisms 80 (e.g., nut, pin, clamp, etc.).

By using the first mounting assembly 30 and the second mounting assembly 32, the storage tank 18 and the axle 34 may be quickly and easily coupled to the frame assembly 16. Furthermore, the frame assembly 16 may accommodate different sized storage tanks and/or axles. Accordingly, the agricultural implement 10 may obviate the acquisition of multiple implements to accommodate varying field configurations, thereby reducing fertilization costs.

Figure 5:
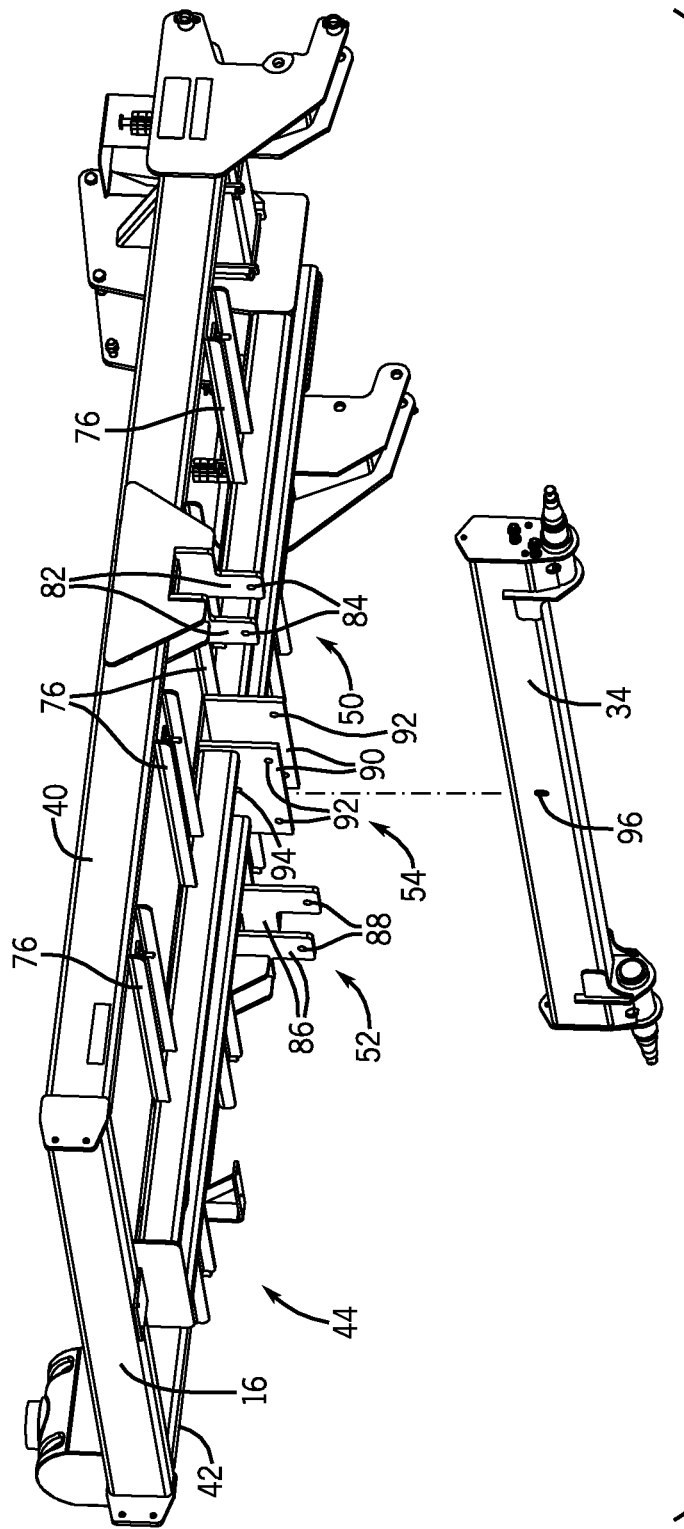
FIG. 5 is an exploded view of an embodiment of an agricultural implement, illustrating an axle mounting assembly.

FIG. 5 is an exploded view of an embodiment of the agricultural implement 10, illustrating an axle 34 mounted to the frame assembly 16. Specifically, the first bracket assembly 50 includes brackets 82 that are configured to be positioned on opposite longitudinal sides of the axle 34 when the axle 34 is installed. For example, during installation, the axle 34 is inserted between the brackets 82. Further, the brackets 82 include openings 84 for insertion of the fastener 56 to hold the axle 34 within the brackets 82. The second bracket assembly 52 is constructed in a similar manner to the first bracket assembly 50. Accordingly, the second bracket assembly 52 includes brackets 86 that are configured to be positioned on opposite longitudinal sides of the axle 34 when the axle 34 is installed. Moreover, the brackets 86 include openings 88 for insertion of the fastener 60 to hold the axle 34 within the brackets 86.

In addition, the third bracket assembly 54 includes brackets 90 that are configured to be positioned on opposite longitudinal sides of the axle 34 when the axle 34 is installed. The brackets 90 include openings 92 for insertion of the fasteners 64 and 66 to hold the axle 34 within the brackets 90. Furthermore, the brackets 90 include openings 94 that align with openings 96 in the axle 34 for insertion of the fastener 72.

As may be appreciated, storage tanks of an agricultural implement 10 may have different sizes to store a different quantity of flowable agricultural product. A storage tank with a larger size may store a greater quantity of flowable agricultural product and may thereby operate for a longer period of time without being refilled. However, a larger storage tank may place greater weight on an axle and/or wheels of the agricultural implement 10. As such, when a larger storage tank is used, an axle of a different size may be used to support the greater weight of the larger storage tank. Furthermore, an axle may have different lengths to facilitate different wheel spacing of the agricultural implement 10. As may be appreciated, different wheel spacing may be used to facilitate different crop row spacing, a dual wheel configuration, and/or a single wheel configuration.

As described herein, the frame assembly 16 includes the first mounting assembly 30 and the second mounting assembly 32 to facilitate modularization. Accordingly, storage tanks of different sizes may be attached to the frame assembly 16. Furthermore, axles of different sizes may be attached to the frame assembly 16. As such, a single agricultural implement 10 may be used to apply fertilizer to fields having various configurations. Therefore, the modularized agricultural implement 10 may be used in place of multiple agricultural implements that are not modularized, thereby decreasing costs.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement, comprising:
a tool bar assembly having a tool bar;
a plurality of row units coupled to the tool bar and configured to deliver flowable agricultural product to a field;
a first storage tank configured to hold the flowable agricultural product and to provide the flowable agricultural product to the plurality of row units;
a frame assembly coupled to the tool bar assembly, wherein the frame assembly comprises a first mounting assembly and a second mounting assembly, the first mounting assembly is configured to removably couple the first storage tank to the frame assembly, the frame assembly is configured to provide structural support to the first storage tank, and the second mounting assembly comprises a first longitudinal beam on a first lateral side of a centerline of the frame assembly, a second longitudinal beam on a second lateral side of the centerline of the frame assembly, a first bracket assembly coupled to the first longitudinal beam, and a second bracket assembly coupled to the second longitudinal beam; and
a first axle having a first end configured to receive a first wheel and a second end configured to receive a second wheel, wherein the first axle is removably coupled to the first and second bracket assemblies and configured to be coupled to the wheels to enable transportation of the agricultural implement;
wherein the first mounting assembly is configured to removably couple a second storage tank having a different storage capacity than the first storage tank to the frame assembly, and the first and second bracket assemblies are configured to removably couple a second axle having different dimensions than the first axle to the frame assembly.

2. The agricultural implement of claim 1, wherein the first or second storage tank is removably coupled to the first mounting assembly via a plurality of fasteners.

3. The agricultural implement of claim 1, wherein the first or second axle is removably coupled to the second mounting assembly via a plurality of fasteners.

4. The agricultural implement of claim 1, wherein the frame assembly comprises a ladder frame.

5. The agricultural implement of claim 1, wherein the second mounting assembly comprises a center beam assembly extending between the first and second longitudinal beams and parallel to the first and second longitudinal beams.

6. The agricultural implement of claim 5, wherein the first mounting assembly comprises a plurality of crossmembers coupled to the first and second longitudinal beams and extending perpendicular to the first and second longitudinal beams.

7. The agricultural implement of claim 6, comprising securing members for mounting the first or second storage tank to the first mounting assembly, wherein each crossmember of the plurality of crossmembers comprises openings for coupling the securing members to the first mounting assembly.

8. The agricultural implement of claim 5, wherein the second mounting assembly comprises a third bracket assembly coupled to the center beam assembly, and wherein the third bracket assembly removably couples the first or second axle to the frame assembly.

9. The agricultural implement of claim 1, wherein the first bracket assembly and the second bracket assembly each comprise a bolt or pin for securing the first or second axle within a respective bracket assembly.

10. An agricultural implement, comprising:
a first storage tank configured to hold flowable agricultural product;
a frame assembly comprising a first mounting assembly and a second mounting assembly, wherein the first mounting assembly is configured to removably couple the first storage tank to the frame assembly, the frame assembly is configured to provide structural support to the first storage tank, and the second mounting assembly comprises a first longitudinal beam on a first lateral side of a centerline of the frame assembly, a second longitudinal beam on a second lateral side of the centerline of the frame assembly, a first bracket assembly coupled to the first longitudinal beam, and a second bracket assembly coupled to the second longitudinal beam; and
a first axle having a first end configured to receive a first wheel and a second end configured to receive a second wheel, wherein the first axle is removably coupled to the first and second bracket assemblies and configured to be coupled to the wheels to enable transportation of the agricultural implement;
wherein the first mounting assembly is configured to removably couple a second storage tank having a different storage capacity than the first storage tank to the frame assembly, and the first and second bracket assemblies are configured to removably couple a second axle having different dimensions than the first axle to the frame assembly.

11. The agricultural implement of claim 10, wherein the first or second axle is removably coupled to the second mounting assembly via a plurality of fasteners.

12. The agricultural implement of claim 10, wherein the flowable agricultural product comprises a liquid fertilizer.

13. The agricultural implement of claim 10, wherein the first or second storage tank is removably coupled to the first mounting assembly via a plurality of fasteners.

14. An agricultural implement, comprising:
a frame assembly comprising a first mounting assembly and a second mounting assembly;
wherein the second mounting assembly comprises a first longitudinal beam on a first lateral side of a centerline of the frame assembly, a second longitudinal beam on a second lateral side of the centerline of the frame assembly, a first bracket assembly coupled to the first longitudinal beam, and a second bracket assembly coupled to the second longitudinal beam; and
wherein the first mounting assembly is configured to removably couple a first storage tank to the frame assembly, the frame assembly is configured to provide structural support to the first storage tank, the first and second bracket assemblies removably couple a first axle to the frame assembly, the first mounting assembly is configured to removably couple a second storage tank having a different storage capacity than the first storage tank to the frame assembly, and the first and second brackets are configured to removably couple a second axle having different dimensions than the first axle to the frame assembly.

15. The agricultural implement of claim 14, comprising and a plurality of crossmembers coupled to the first and second longitudinal beams and extending perpendicular to the first and second longitudinal beams.

16. The agricultural implement of claim 15, wherein the first mounting assembly comprises the plurality of crossmembers, and the plurality of crossmembers comprise openings for coupling securing members of the first or second storage tank to the first mounting assembly.

17. The agricultural implement of claim 15, wherein the first bracket assembly and the second bracket assembly each comprise a bolt or pin for securing the first or second axle within a respective bracket assembly.

* * * * *